(12) United States Patent
Beck

(10) Patent No.: US 8,789,897 B2
(45) Date of Patent: Jul. 29, 2014

(54) METHOD FOR DIMENSIONING THE ADMISSION PRESSURE AT AN ANALOGIZED ELECTROMAGNETICALLY ACTUATED HYDRAULIC VALVE

(75) Inventor: Erhard Beck, Weilburg (DE)

(73) Assignee: Continental Teves AG & Co. oHG (DE)

( * ) Notice: Subject to any disclaimer, the term of this patent is extended or adjusted under 35 U.S.C. 154(b) by 853 days.

(21) Appl. No.: 12/668,945

(22) PCT Filed: May 15, 2008

(86) PCT No.: PCT/EP2008/055938
§ 371 (c)(1),
(2), (4) Date: Feb. 3, 2010

(87) PCT Pub. No.: WO2009/010319
PCT Pub. Date: Jan. 22, 2009

(65) Prior Publication Data
US 2010/0201184 A1 Aug. 12, 2010

(30) Foreign Application Priority Data
Jul. 14, 2007 (DE) .......................... 10 2007 032 950

(51) Int. Cl.
*B60T 8/60* (2006.01)
(52) U.S. Cl.
USPC .................. 303/146; 303/3; 303/10; 303/11; 303/15; 303/122.12
(58) Field of Classification Search
USPC ........... 303/122.1, 122.12, 122.09, 122.05, 3, 303/10, 11, 15, 116.1, 113.1
See application file for complete search history.

(56) References Cited

U.S. PATENT DOCUMENTS

| 4,726,629 | A | * | 2/1988 | Resch ........................ 303/122.1 |
| 5,628,550 | A | * | 5/1997 | Zaviska et al. ............. 303/115.4 |
| 5,632,531 | A | * | 5/1997 | Batistic et al. ............. 303/113.4 |
| 6,048,038 | A |   | 4/2000 | Zaviska et al. |
| 6,086,164 | A | * | 7/2000 | Oehler et al. ............. 303/119.2 |
| 6,123,395 | A | * | 9/2000 | Wolf et al. ....................... 303/11 |
| 6,132,010 | A | * | 10/2000 | Holt et al. ....................... 303/11 |
| 6,293,237 | B1 | * | 9/2001 | Vorih ......................... 123/90.12 |
| 6,446,490 | B1 | * | 9/2002 | Lohner et al. ..................... 73/39 |
| 6,511,137 | B2 | * | 1/2003 | Gerdes .......................... 303/156 |
| 6,668,634 | B1 | * | 12/2003 | Zimmermann et al. ........ 73/129 |

(Continued)

FOREIGN PATENT DOCUMENTS

| DE | 3730523 A1 | 3/1989 |
| DE | 10341027 A1 | 3/2004 |

(Continued)

*Primary Examiner* — Robert A Siconolfi
*Assistant Examiner* — James Hsiao
(74) *Attorney, Agent, or Firm* — RatnerPrestia

(57) ABSTRACT

A method for dimensioning the admission pressure at a first, analogized, electromagnetically actuated hydraulic valve for sensitively regulating the pressure in a pressure circuit in which the admission pressure at the first valve can be set by the delivery capacity of an engine pump assembly which is connected to the first valve via a pump-outlet-side pressure line, in particular in a hydraulic motor vehicle brake system, wherein the admission pressure is set by electronically evaluating the tappet reaction of the first valve or of a further hydraulic valve which is also actuated electromagnetically and is connected to the pump-outlet-side pressure line. An electronically controlled motor vehicle brake pressure control device with which the above method can be carried out is also described.

9 Claims, 2 Drawing Sheets

(56) References Cited

U.S. PATENT DOCUMENTS

| | | |
|---|---|---|
| 7,039,554 B2 * | 5/2006 | Nguyen et al. .................. 702/183 |
| 7,140,699 B2 * | 11/2006 | Gronau et al. ............. 303/113.4 |
| 2001/0033105 A1 * | 10/2001 | Frank et al. ...................... 303/20 |
| 2002/0024253 A1 * | 2/2002 | Gerdes ....................... 303/119.1 |
| 2003/0098613 A1 * | 5/2003 | Bohm et al. .................. 303/166 |
| 2005/0067895 A1 * | 3/2005 | Marathe ................... 303/122.09 |
| 2007/0005216 A1 | 1/2007 | Heinz et al. |
| 2007/0158607 A1 * | 7/2007 | Fey et al. .................. 251/129.16 |
| 2007/0273203 A1 * | 11/2007 | Kaestner et al. ........... 303/119.2 |
| 2008/0231108 A1 | 9/2008 | Attallah et al. |
| 2009/0115247 A1 * | 5/2009 | Leiber et al. .................. 303/154 |

FOREIGN PATENT DOCUMENTS

| | | |
|---|---|---|
| WO | WO 96/28325 | 9/1996 |
| WO | WO 2005/012056 A1 | 2/2005 |
| WO | WO2007/025951 A1 | 3/2007 |

* cited by examiner

METHOD FOR DIMENSIONING THE ADMISSION PRESSURE AT AN ANALOGIZED ELECTROMAGNETICALLY ACTUATED HYDRAULIC VALVE

CROSS REFERENCE TO RELATED APPLICATIONS

This application is the U.S. national phase application of PCT International Application No. PCT/EP2008/055938 filed May 15, 2008, which claims priority to German Patent Application No. 10 2007 032 950.6 filed Jul. 14, 2007, the contents of such applications being incorporated by reference herein.

FIELD OF THE INVENTION

The invention relates to a method for dimensioning the admission pressure at an analogized, electromagnetically actuated hydraulic valve.

BACKGROUND OF THE INVENTION

DE 103 41 027 A1 which is incorporated by reference discloses a method for longitudinal control (ACC) which can be carried out in or with a two-circuit ABS/ESP motor vehicle brake control unit which is used on a widespread basis with a pump. In order to meter the hydraulic brake pressure, an analog-control, electrically actuable hydraulic isolating valve is used which, in contrast to control with an inlet valve which is actuated in analog fashion, permits pressure control over an entire brake circuit. The hydraulic valves which are used for pressure control are generally conventional, electromagnetically operated seat valves which are designed for switching. However, if these are actuated by means of a pulse-width-modulated (PWM) current in such a way that the valve tappet assumes a floating position, it is also possible to carry out analog control of the throughflow. However, to do this it is necessary to carry out the current control in a very precise and reproducible fashion. This is generally possible without relatively serious problems if the pressure to be applied can be applied via a pressure sensor in conjunction with a control loop. It is considerably more difficult to perform a corresponding analog control method without a pressure sensor in the pressure circuit which is to be controlled. In this case, use is frequently made of stored valve characteristic curves which, in conjunction with control methods which are known per se, permit pressure to be set in the wheel without additional wheel pressure sensors. The valve characteristic curve mentioned above therefore permits pressure to be set by means of the valve in accordance with a pressure request which is present at the controller as an input variable.

WO 2007/025951 (P 11192) which is incorporated by reference describes a method for determining an admission pressure prevailing between a master brake cylinder and an inlet valve of a wheel brake cylinder of a motor vehicle brake system, which method determines the admission pressure by taking into account the profile of a run-on voltage of a motor, operated in clocked fashion, of a pump which is used to feed back brake fluid from a low pressure accumulator into the master brake cylinder. In order to determine the admission pressure, electrical characteristic variables of the voltage profile are measured and respectively used to determine an admission pressure value. However, with this method it is still not yet possible to determine with sufficient precision the pressure which is brought about by the pump.

WO 2005/012056 A1 (P 10991) which is incorporated by reference discloses a method for determining the pressure of a fluid or the differential pressure which is present at an electromagnetically actuable control valve, in which method the pressure control valve is used to measure pressures. The pressure control valve comprises the customary components of an electrohydraulic pressure control valve such as an exciter coil, a valve tappet, valve domes, etc. The pressures are measured by means of an electronic control circuit which adjusts the position of the valve activation device or the magnetic force. The variable which is used for control purposes and is employed as an actual value represents the hydraulic force acting on the valve tappet. This force is measured by measuring the corresponding magnetic force which can be acquired from the voltage which is induced in the region of the exciter coil.

SUMMARY OF THE INVENTION

An object of the present invention is then to operate particularly economically and with little noise an electronic pressure control device with functional components for actively building up pressure.

The invention relates to the idea of setting, in the case of an analogized valve control system, the best possible admission pressure at the valve control system. As a rule, the admission pressure is a certain amount higher than the pressure at the outlet side of the valve. In the exemplary case of control with an isolating valve, the admission pressure is also referred to as overflow pressure. The overflow pressure denotes the pressure which is brought out when there is an active buildup of pressure by a motor pump assembly upstream of the isolating valve on the side connected upstream of the pump outlet and the wheel inlet valves, and this occurring, for example, during an automatic cruise control (ACC) process. The admission pressure or overflow pressure in an isolating valve control process is therefore determined essentially by the rotational speed and the switch-on period of the pump motor and the open position of the isolating valve. For reasons of comfort, noise and economy, attempts are made to keep the differential pressure, in particular the overflow pressure, prevailing at the controlled valve as low as possible. In contemporary brake systems, this is, however, not possible to an optimum degree owing to fabrication tolerances in the motor-pump chain since due to the electronic actuation it is always necessary to provide a sufficient offset for actuation of the pump so that sufficient overflow is also ensured even in the case of brake control units with relatively weak motor pump assemblies.

In order to dimension the admission pressure, according to aspects of the invention a setpoint value is preferably predefined for the motor of the motor pump assembly, wherein an electrical signal from the tappet position control circuit is included in the acquisition of the setpoint value.

According to aspects of the invention, the admission pressure is set by electronic evaluation of the tappet reaction of a valve. The term "tappet reaction" is to be understood as comprising both the case of a tappet movement which is caused by a change in pressure and the case in which only the electronic actuation system of the corresponding valve reacts to a change in pressure of the valve by changing the current without the tappet position changing appreciably. It is therefore also possible that in this context only the force relationships change since, for example due to a higher pressure difference, a larger valve current has to be set. The tappet reaction can preferably be evaluated with the control circuit described above if the tappet is located in, or in the vicinity of, an equilibrium of forces between the magnetic force (minus or plus the valve spring force) and the hydraulic force. If the forces are far apart from one another, the tappet cannot react to a change in pressure.

The tappet reaction can be observed at the valve at which the admission pressure is to be determined, or at a further valve. In principle any electromagnetically actuated hydraulic valve can be used for this purpose provided that it is connected to the output side of the motor pump assembly via a pressure line. The tappet reaction, in particular the position of the tappet or the hydraulic force, is preferably determined by means of an electrical tappet position control circuit.

The differential pressure at the measuring valve is preferably measured on the basis of the tappet reaction by means of what is referred to as the TPM method. The TPM (Tappet Position Monitoring) permits the position of the tappets in an electromagnetically actuated valve or the force acting on the tappet of the valve to be set, and in particular measured, by means of a control system.

DETAILED DESCRIPTION OF THE PREFERRED EMBODIMENTS

Figure 1:
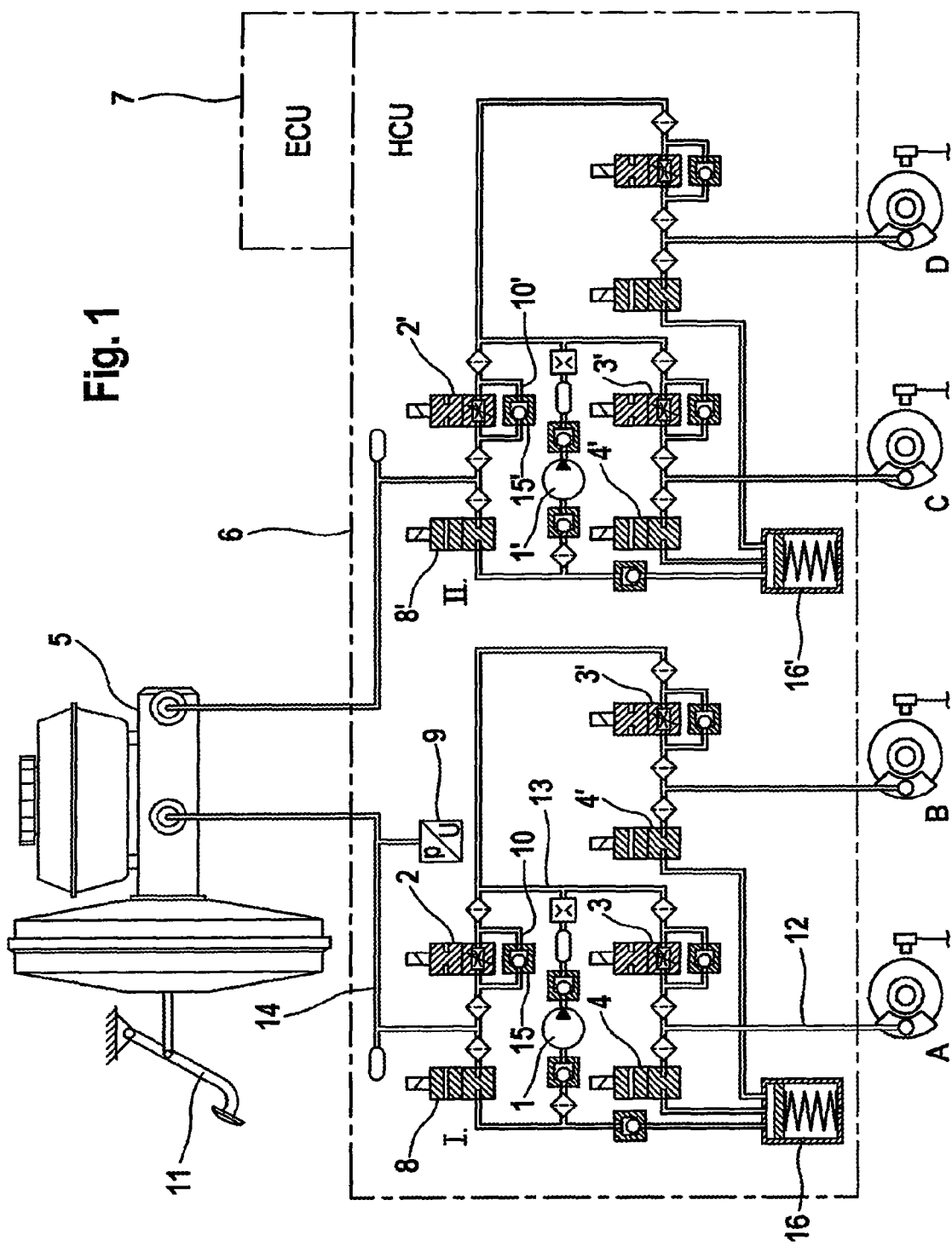
FIG. 1 is a schematic illustration of a brake device for ABS and ESP control processes.

In FIG. 1, the tandem master cylinder 5 is connected to the hydraulic unit 6 (HCU) of an electronic motor vehicle brake system. The electronic unit 7 (ECU) comprises a microprocessor/controller system with which the actuators and sensors which are contained in the valve block can be electronically controlled and measured. The hydraulic unit 6 is divided into two brake circuits I and II. In addition, each of the brake circuits comprises two wheel pressure circuits (A, B and C, D, respectively) each with an inlet valve 3 or 3', respectively, and an outlet valve 4 or 4', respectively. The electronic system of the ECU 7 comprises a multi-channel current controller which permits independent control of the currents through the coils of the isolating valves 2, 2', and those of the inlet valves 3, 3'. Reference symbols 8 and 8' respectively denote electronic changeover valves which are closed in the currentless state. In the hydraulic line 8 which leads to the master cylinder 5 there is an input pressure sensor 9. The illustrated brake system does not comprise any further pressure sensors in the wheel pressure circuits themselves. The motor-pump assembly 1 or 1', respectively, is used to actively build up pressure at ACC, TCS and ESP control systems as well as for feeding back the pressure medium which has been discharged at the outlet valves and which is located in the low pressure accumulator 16 or 16'. When pump 1 is switched on, it feeds pressure volume in the direction of the line 13, with the result that the admission pressure increases. Owing to the design of the pump, the pressure at the output of the pump pulses in a pressure range which is dependent on the design of the hydraulic components.

During the dimensioning of the admission pressure, the pump 1 for generating pressure pulsations is firstly actuated with a suitable PWM current. At the inlet valve 3 which is operated in an analogized fashion, the pressure pulsations which occur during the feeding of pressure medium by means of the hydraulic pump result in a differential pressure which can at least be measured qualitatively. Quantitative determination of the pressure is in principle also possible with the TPM method, and is therefore alternatively preferred. The PWM current for the pump is set by means of a controller which uses the measured differential pressure as the actual value or at least also includes it in the control process.

Figure 2:
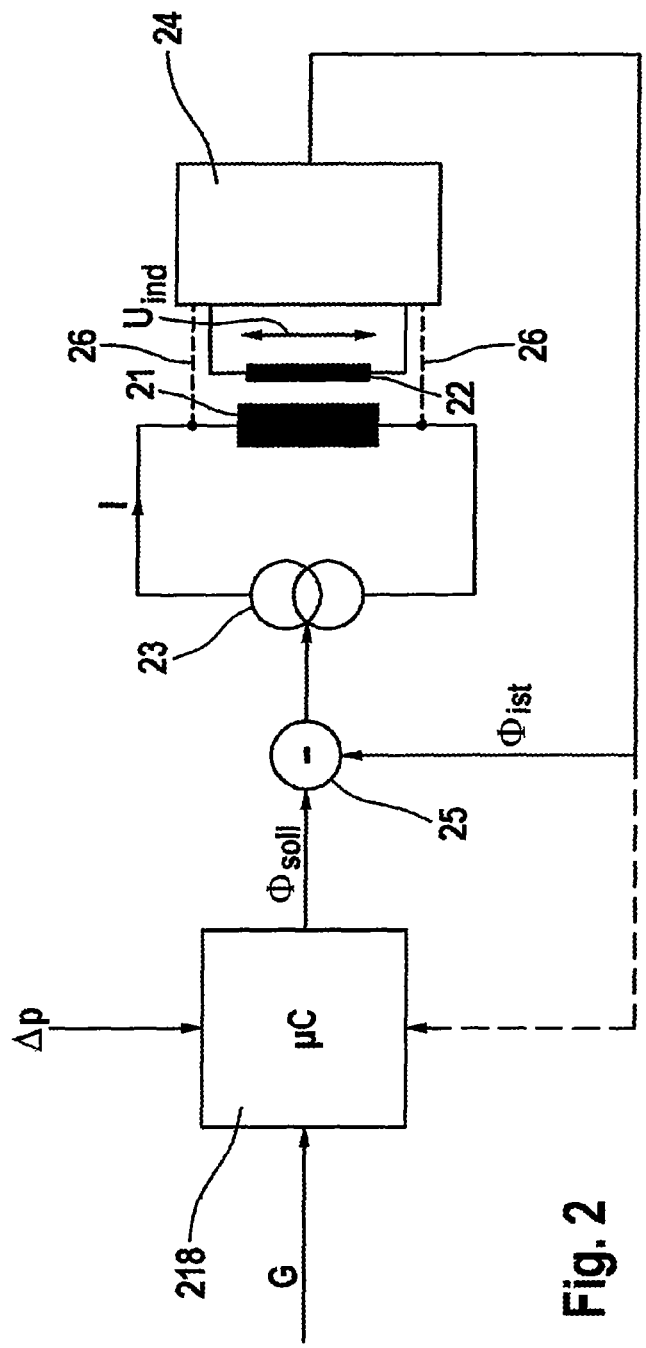
FIG. 2 is a schematic illustration of a control circuit for controlling the magnetic flux with a measuring coil.

The microcontroller system 218 in FIG. 2 carries out all the control tasks of the brake device and is arranged within ECU 7 (FIG. 1). The latter actuates the coil of the electromagnetically operated valve 21 via power source 23. For the sake of simplicity, only one valve-booster combination is illustrated. With the power source 3, the coil current I can be set and also measured individually in a pulse-width-modulated fashion for each valve. In the brake device above, corresponding valve drivers are provided for each valve, said valve drivers being implemented by means of individually actuable PWM driver stages. Provided in the region of the magnetic field of the coil is a wire loop or auxiliary loop 22 whose connecting terminals are connected to the measuring device 24. The auxiliary coil is, in particular, arranged in such a way that it senses the effective magnetic flux through the yoke and armature of the coil. The measuring device 24 contains a circuit with which the induction voltage $U_{ind}$ which is present at the measuring coil or wire loop can be measured. In principle, the induced voltage can also be tapped directly at the valve coil, as is shown by dashed lines 26. A signal $\Phi_{ist}$ is available at the output of the measuring device 4 by means of the magnetic flux which is proportional to the integral over the induced voltage $U_{ind}(t)$.

When there is a movement of the valve tappet which is caused externally or by the booster, a change occurs in the magnetic flux $\Phi$ in the valve coil 21 which can be measured by the measuring device 24 by means of the induction voltage $U_{ind}$. The measuring device 24 forms the time integral over the profile of the induced voltage $U_{ind}$ and feeds the integrated signal to the microcontroller 218 or to an additional controller 25. A means of controlling the stroke of the tappet or the force of the tappet is accordingly implemented by feeding back the signal of the measuring device into the microcontroller.

According to one preferred embodiment there is provision that the signal which is generated by means of the tap device 22, 24 is to be integrated over time in order to acquire a variable which is proportional to the magnetic flux or the magnetic force. As a result, it is then possible to infer the hydraulic force by taking into account the spring force of the valve, and the differential pressure at the valve can then be acquired from said hydraulic force. In this way, by taking into account the fabrication-dependent properties of the valve it is possible to measure the admission pressure directly in order to adjust the overflow pressure.

The invention claimed is:

1. A method for dimensioning an admission pressure at a first, analogized, electromagnetically actuated hydraulic valve for sensitively regulating the pressure in a pressure circuit in which the admission pressure at the first valve is configured to be set by a delivery capacity of a motor pump assembly which is connected to the first valve via a pump-outlet-side pressure line in a hydraulic motor vehicle brake system, wherein the admission pressure is set by electronically evaluating a tappet reaction of the first valve or of a further hydraulic valve which is also actuated electromagnetically and is connected to the pump-outlet-side pressure line, the tappet reaction comprising both a change in position of the tappet and a change in hydraulic force on the tappet, wherein the tappet reaction is determined by an electrical tappet position control circuit, and wherein the admission pressure is generated at least in part by a motor pump assembly, and in order to dimension the admission pressure, an electrical signal from the tappet position control circuit is used to calculate a setpoint value for a motor of the motor pump assembly.

2. The method as claimed in claim 1, wherein the hydraulic brake system comprises a plurality of inlet valves and outlet valves which are respectively assigned to wheel pressure circuits, and wherein the first valve or the further valve is an analog-actuable isolating valve for disconnecting a brake activation unit from the inlet valves of the wheel brake circuits.

3. The method as claimed in claim 1, wherein the first valve or the further valve is provided with an electrical tap device which permits a position of the tappet to be determined electronically.

4. The method as claimed in claim 3, wherein an induction voltage or an induction current when a tappet movement occurs is determined by the electrical tap device, either by tapping at the valve coil itself or by using an additional wire loop or wire coil in a region of a magnetic circuit of a solenoid valve.

5. The method as claimed in claim 3, wherein the signal which is generated by the electrical tap device is integrated over time in order to acquire a variable which is proportional to a magnetic flux or to a magnetic force, wherein a hydraulic force, from which a differential pressure at the valve can then be acquired, is inferred by taking into account a spring force of the valve.

6. The method as claimed in claim 1, wherein the first valve, or the further valve, is set by a current setting in, or in a vicinity of, an equilibrium of forces, with a result that the first valve, or the further valve, is sensitive to pressure changes.

7. The method as claimed in claim 1, wherein the first valve, or the further valve, is used to determine a differential pressure present at the valve.

8. An electronically controlled motor vehicle brake pressure control device comprising:
 at least one controller,
 a motor pump assembly with which a pressure medium is configured to be fed into a hydraulic assembly via pressure lines as a function of a driver's request,
 isolating valves for disconnecting wheel pressure circuits from the motor pump assembly, and
 inlet valves which are hydraulically connected to the isolating valves and the wheel pressure circuits,
 wherein the at least one controller is configured to actively build up pressure with the pressure generating means, and wherein the at least one controller is configured to carry out a method according to claim 1.

9. The device as claimed in claim 8, wherein the at least one controller is an ESP controller.

* * * * *